(12) United States Patent
Cruz et al.

(10) Patent No.: US 11,480,486 B2
(45) Date of Patent: Oct. 25, 2022

(54) INTEGRATED SENSOR AND SERVICE PORT WITH ANTI-BLOWBACK FEATURE FOR HVAC EQUIPMENT OR HVAC SYSTEM

(71) Applicant: WATSCO VENTURES LLC, Coconut Grove, FL (US)

(72) Inventors: Mario A. Cruz, Miami, FL (US); Charles Peter Harland, Waterloo (CA); Maximilian Alexander Pfeifle, Waterloo (CA)

(73) Assignee: WATSCO VENTURES LLC, Coconut Grove, FL (US)

( * ) Notice: Subject to any disclaimer, the term of this patent is extended or adjusted under 35 U.S.C. 154(b) by 144 days.

(21) Appl. No.: 17/039,200

(22) Filed: Sep. 30, 2020

(65) Prior Publication Data
US 2021/0010731 A1 Jan. 14, 2021

Related U.S. Application Data

(63) Continuation-in-part of application No. 16/273,205, filed on Feb. 12, 2019, now Pat. No. 10,876,753.

(60) Provisional application No. 62/629,479, filed on Feb. 12, 2018.

(51) Int. Cl.
*F25B 45/00* (2006.01)
*G01L 19/00* (2006.01)
*F25B 49/00* (2006.01)
*F25B 41/40* (2021.01)

(52) U.S. Cl.
CPC .......... *G01L 19/0023* (2013.01); *F25B 41/40* (2021.01); *F25B 45/00* (2013.01); *F25B 49/005* (2013.01); *F25B 2345/001* (2013.01); *F25B 2345/006* (2013.01); *F25B 2500/221* (2013.01); *F25B 2700/19* (2013.01); *F25B 2700/21* (2013.01)

(58) Field of Classification Search
CPC ...... G01L 19/0023; F25B 41/40; F25B 45/00; F25B 49/005; F25B 2345/001; F25B 2345/006; F25B 2500/221; F25B 2700/19; F25B 2700/21
See application file for complete search history.

(56) References Cited

U.S. PATENT DOCUMENTS

| 4,338,793 | A | * | 7/1982 | O'Hern, Jr. | ............. F25B 45/00 285/133.11 |
| 6,345,238 | B1 | * | 2/2002 | Goodwin | ................. G01K 7/10 327/512 |
| 2008/0289353 | A1 | * | 11/2008 | Maruya | ................... F25B 45/00 137/322 |
| 2009/0113901 | A1 | * | 5/2009 | Carrubba | ................ F25B 45/00 62/77 |

(Continued)

OTHER PUBLICATIONS

Mexican Search Reporting issued in Application No. MX/a/2019/001745 dated Aug. 10, 2022.

(Continued)

*Primary Examiner* — Gary Collins
(74) *Attorney, Agent, or Firm* — DLA Piper LLP (US)

(57) ABSTRACT

An integrated sensor and service port for HVAC (heating, ventilating, and air conditioning) equipment or an HVAC system. The integrated sensor and service port may comprise an anti-blowback mechanism.

19 Claims, 6 Drawing Sheets

(56) References Cited

U.S. PATENT DOCUMENTS

| | | | | |
|---|---|---|---|---|
| 2010/0201118 A1* | 8/2010 | Anton | ................... | F16J 15/064 |
| | | | | 285/382.7 |
| 2011/0066389 A1* | 3/2011 | Weick | ..................... | F25B 45/00 |
| | | | | 702/50 |
| 2011/0219790 A1* | 9/2011 | Denton | .................. | F25B 45/00 |
| | | | | 62/77 |
| 2013/0147184 A1* | 6/2013 | Lutzke | ................... | F16L 47/32 |
| | | | | 285/119 |
| 2014/0265317 A1* | 9/2014 | Pearl, II | ................. | F16L 15/08 |
| | | | | 285/317 |
| 2016/0003509 A1* | 1/2016 | Pistone | .............. | G01L 19/0007 |
| | | | | 374/143 |
| 2016/0076783 A1* | 3/2016 | Whitehead | ............... | F24F 11/62 |
| | | | | 340/870.07 |
| 2016/0290694 A1* | 10/2016 | Pearl | ....................... | F16L 55/07 |
| 2018/0142813 A1* | 5/2018 | Pearl, II | ............. | F16L 27/0816 |
| 2019/0001763 A1* | 1/2019 | Jordan | ................. | B60C 29/002 |
| 2019/0001765 A1* | 1/2019 | Jordan | ............... | B60C 23/0496 |

OTHER PUBLICATIONS

Translation of Mexican Search Reporting issued in Application No. MX/a/2019/001745 dated Aug. 10, 2022.

\* cited by examiner

INTEGRATED SENSOR AND SERVICE PORT WITH ANTI-BLOWBACK FEATURE FOR HVAC EQUIPMENT OR HVAC SYSTEM

RELATED APPLICATION AND PRIORITY CLAIM

This application is a continuation-in-part of U.S. application Ser. No. 16/273,205, filed on Feb. 12, 2019, which claims the benefit of U.S. Provisional Application No. 62/629,476, filed Feb. 12, 2018, which are hereby incorporated by reference in their entireties.

BACKGROUND

The disclosed embodiments relate to and provide an integrated sensor (e.g., pressure sensor) and service port for HVAC (heating, ventilating, and air conditioning) equipment or an HVAC system. In one or more embodiments, the integrated sensor and service port comprises an anti-blowback feature.

An HVAC system can be used to regulate the environment within an enclosed space. An HVAC system includes one or more service ports that can be used, for example, to charge the system. These ports can also be used to perform diagnostics on the system to ensure that the system is working correctly. For example, the pressure at the port can be checked to make sure it is within operational specifications. Unfortunately, to check the pressure, the port must be disconnected from the charging line so that the sensor can be attached to the port. This is undesirable as it requires additional labor and time to test the pressure. Moreover, charging cannot be performed while the pressure sensor is connected to the port.

One alternative approach is illustrated in FIG. 1. As shown, a prior art assembly 10 includes a "T" connector 12 having one part 12A of the "T" connected to a pressure sensor 16 via a coupler 14 (e.g., by screwing them together). A communication port connector 18 such as e.g., a metripack connector is connected to the pressure sensor (e.g., by screwing them together). A second part 12B of the connector 12 is attached to the service port (usually a Schrader valve) using e.g., a flare nut 20. Using the "T" connector 12, the charging line can be connected at a third part 12C of the T, while the pressure sensor can be connected to the first part 12A of the T as discussed above.

While solving the problem of having to disconnect charging while testing the pressure, this alternative has other shortcomings. For example, the various connections forming the screwed-together assembly 10 are points that can introduce leaks. Due to the rather large size of the components, the assembly is also subject to physical damage as the connector 12 and sensor 16 extend from the HVAC unit and can be stepped on or bumped into by someone walking by the unit. Moreover, the assembly is not esthetically pleasing.

As can be appreciated, to function properly, the part 12B connected to the service port, which is usually a Schrader valve, must have a depressor (not shown) to activate the service port. Because the depressor is rigidly attached to the "T" connector 12 housing, during installation, the depressor would depress the service port's valve core before the flare nut 20 is fully threaded onto the service port. This depression causes refrigerant to exit the service port before the flare nut 20 seals the flare fitting to the service port. The exiting refrigerant could, among other things, rapidly cool the surroundings, block the view of installer, and escape into the atmosphere—all of which are undesirable.

Accordingly, there is a need and desire for a better way to connect a pressure or other sensor (e.g., temperature sensor) to a service port of an HVAC system.

SUMMARY

The disclosed embodiments relate to and provide an integrated sensor and service port for HVAC (heating, ventilating, and air conditioning) equipment or an HVAC system. In one embodiment, the sensor may be a pressure sensor. In another embodiment, the sensor may be a temperature sensor or a combined pressure and temperature sensor. In one or more embodiments, the integrated sensor and service port comprises an anti-blowback feature/mechanism.

In one embodiment, an apparatus is provided. The apparatus comprises a housing, said housing having a first connection portion, a second connection portion and a sensor integrated therein, the first connection portion being configured to connect with and cooperate with a service port of heating, ventilating, and air conditioning (HVAC) equipment, the second connection portion being configured to function as the service port, and the sensor adapted to sense a characteristic of the HVAC equipment.

In another embodiment, an integrated sensor and service port device is provided. The integrated sensor and service port device comprises a brass housing, said housing having a service port opening and connection portion, a service port portion and a sensor integrated therein.

In yet another embodiment an apparatus is provided. The apparatus comprises a housing, said housing having a first connection portion, a second connection portion and a sensor integrated therein, the first connection portion being configured to connect with and cooperate with a service port of heating, ventilating, and air conditioning (HVAC) equipment, the second connection portion being configured to function as the service port, the sensor adapted to sense a characteristic of the HVAC equipment, and an anti-blowback mechanism adapted to prevent the service port of the HVAC equipment from being opened until the first connection portion is connected to the service port of the HVAC equipment.

In another embodiment, an integrated sensor and service port device is provided. The integrated sensor and service port device comprises a brass housing, said housing having a service port opening and connection portion, a service port portion and a sensor integrated therein, the service port opening and connection portion configured to connect with and cooperate with a service port of heating, ventilating, and air conditioning (HVAC) equipment, and an anti-blowback mechanism adapted to prevent the service port of the HVAC equipment from being opened until the service port opening and connection portion is connected to the service port of the HVAC equipment.

DESCRIPTION OF DRAWINGS

Like reference symbols in the various drawings indicate like elements.

DESCRIPTION

Figure 1:
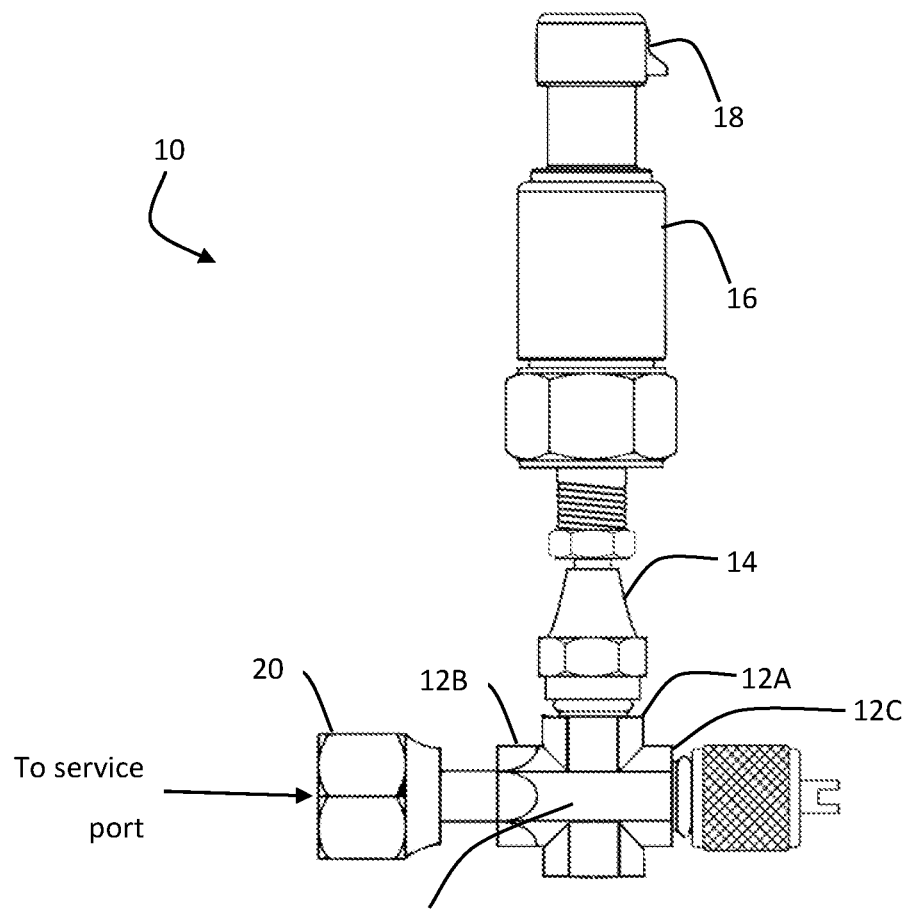
FIG. 1 illustrates a prior art assembly that may be used to measure pressure sensor on HVAC equipment or an HVAC system.
Figure 2:
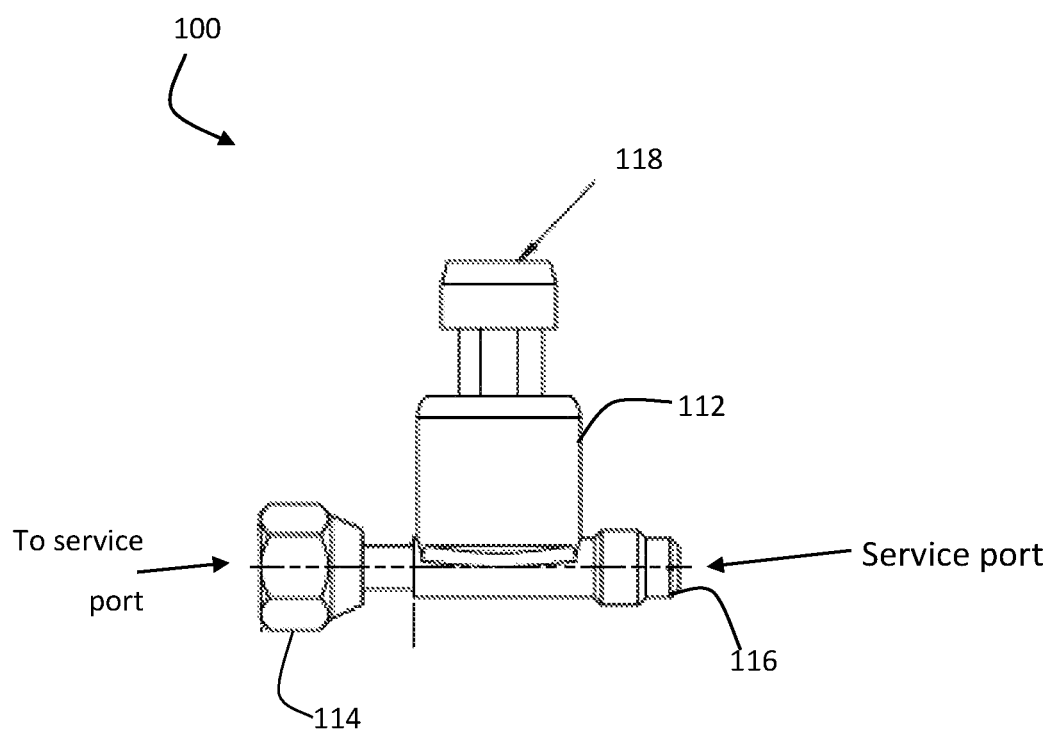
FIGS. 2-4 illustrate an example embodiment of an integrated sensor and service port in accordance with the disclosed principles.
Figure 3:
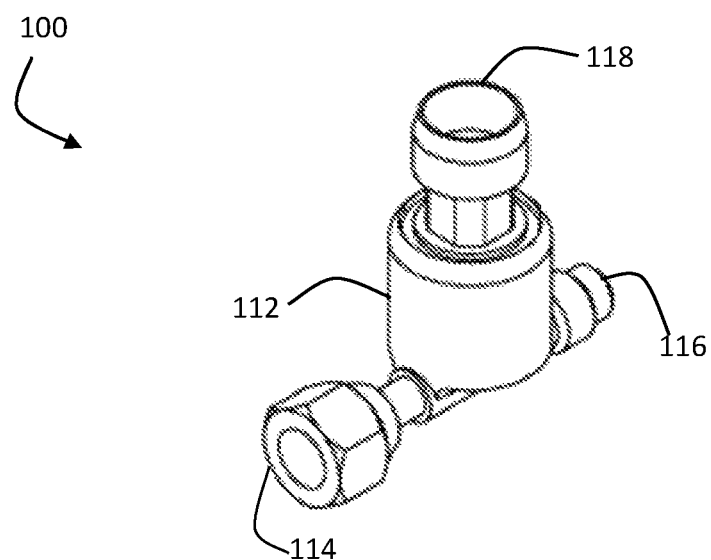

The disclosed embodiments relate to and provide an integrated sensor and service port for HVAC (heating, ventilating, and air conditioning) equipment or an HVAC system. In one embodiment, the sensor may be a pressure sensor. In another embodiment, the sensor may be a temperature sensor or a combined pressure and temperature sensor. In one or more embodiments, the integrated sensor and service port comprises an anti-blowback feature/mechanism.

In one or more embodiments disclosed herein, the integrated sensor and service port may comprise a pressure sensor and may be placed and used to e.g., determine: (1) pressure at the suction line service valve and/or (2) pressure at the liquid line service valve. The integrated sensor and service valve port may be connected to one or both of the Schrader valves (high side and low side).

FIGS. 2-6 illustrate an embodiment of the integrated sensor and service port 100 constructed in accordance with the disclosed principles. In the illustrated embodiment, the integrated sensor and service port 100 includes a single housing 112 into which a pressure sensor 120 (or other sensor such as e.g., a temperature sensor) may be integrated therein. In addition, a first connection portion 114 that may be a connector adapted to connect to and cooperate with an HVAC service port (e.g., Schrader valve or other type of valve) and a second connection portion 116 that may include a depressor valve 136 that may function as a service port (e.g., Schrader valve or other type of valve) may also be integrated as part of the housing 112. In one embodiment, a third connection portion 118 that may be a connector providing a mechanism to communicate the sensor's 120 reading outside of the integrated sensor and service port 100 may also be integrated as part of the housing 112.

Figure 4:
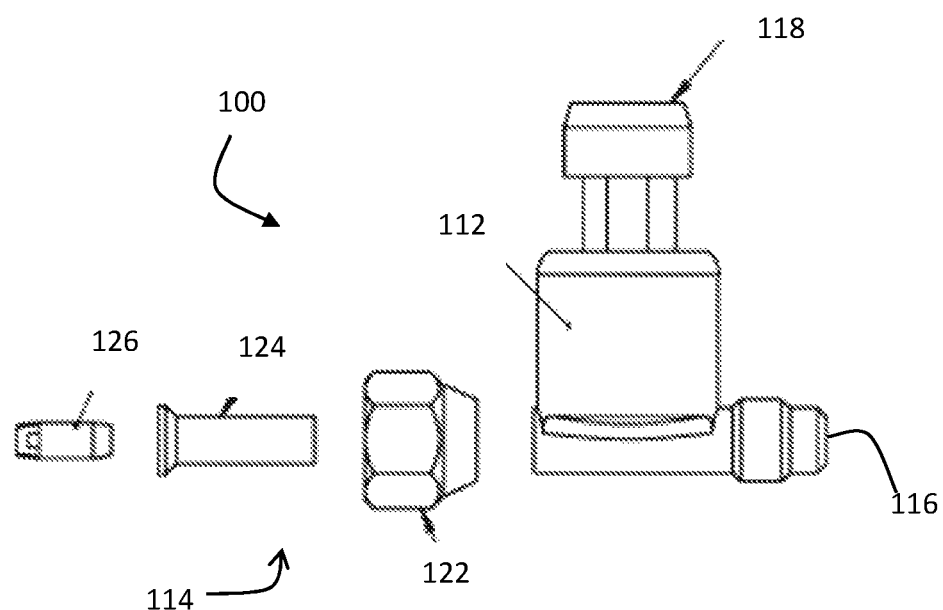

The first connection portion 114 is shown in an exploded view in FIG. 4. Referring to FIG. 4, the first connection portion 114 may include a brass tube fitting 124, flare nut 122 and a depressor fitting 126 such as e.g., a Schrader depressor fitting integrated therein. As can be appreciated, the first connection portion 114 may be connected to a service port typically used for HVAC equipment (e.g., Schrader valve or other type of valve). In the illustrated example, the first connection portion 114 includes a Schrader valve depressor 126 adapted to open the Schrader valve or other type of valve used by the equipment's service port. Thus, once the first connection portion 114 is connected to the HVAC equipment, the HVAC equipment's service port (e.g., valve) is opened by the depressor fitting 126 thus allowing the system pressure to reach the pressure sensor.

The second connection portion 116 of the integrated sensor and service port 100, due to its configuration discussed below, may be used as a service port to be connected to the charging line or other service equipment. In essence, the second connection portion 116 is an extension of the equipment's service port, allowing a charging or other line to be connected to the unit through the integrated sensor and service port 100.

Figures 5, 6:
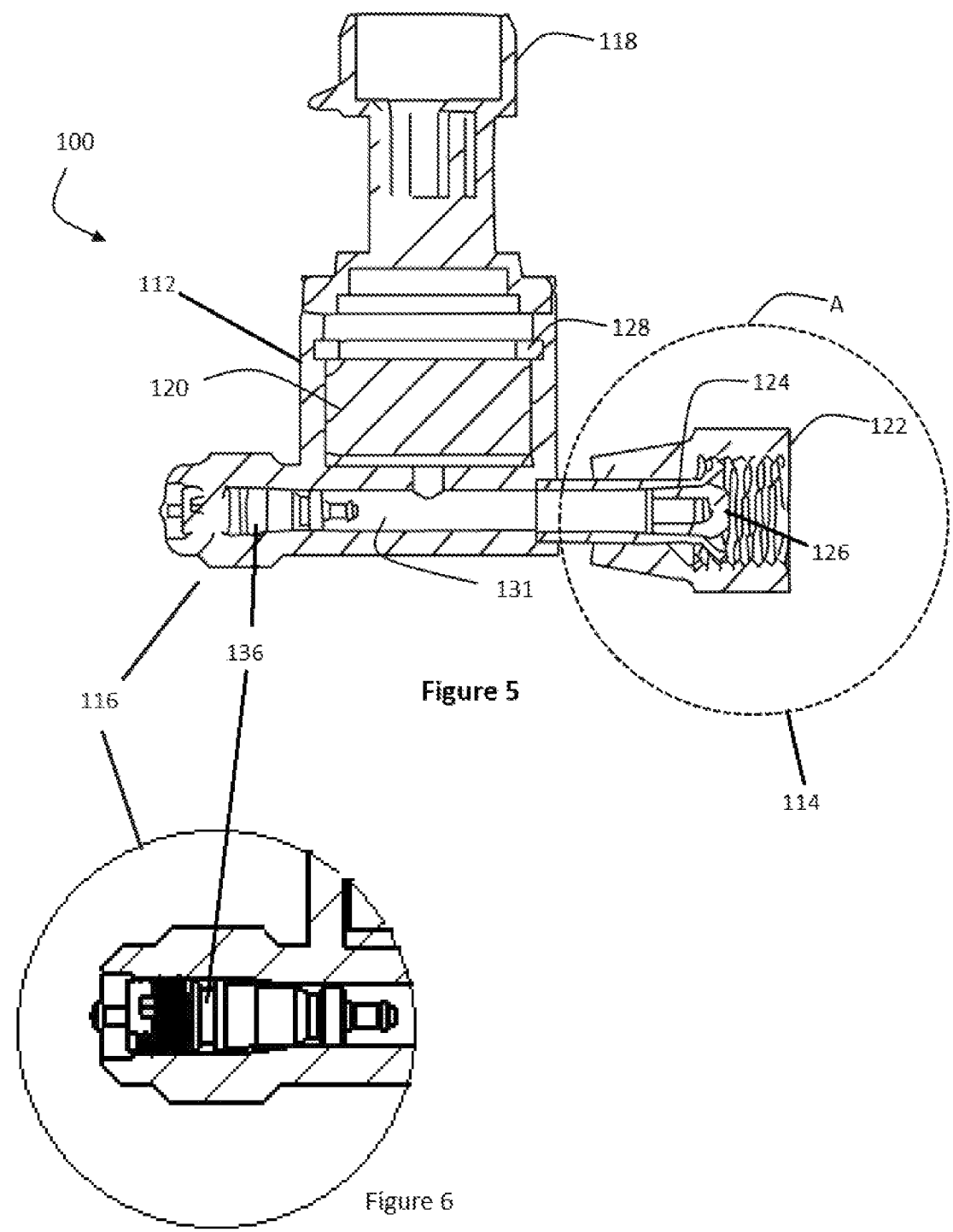
FIG. 5 illustrates a cross-sectional view of the integrated sensor and service port in accordance with the disclosed principles.
FIG. 6 illustrates an exploded view of the flare connection used to seal to the service port of an HVAC system.

As shown in the cross-sectional view of FIG. 5, the second connection portion 116 may include the threads and seal surface adapted to connect to a charging or other line typically connected to an HVAC service port. FIG. 6 illustrates an exploded view of the second connection portion 116. As can be seen, the second connection portion may include the threads and seal surface a valve 136. When connected to a charging line or other service equipment with the proper depressor, the valve pin of the valve 136 will be depressed thereby opening up the valve to allow charging or other material to enter the housing 112.

As shown in the cross-sectional view of FIG. 5, a channel 131 is formed within a tube portion of the housing 112 between the first and second connection portions 114, 116, which allows the charging or other material to enter the HVAC equipment through the first connection portion 114 of the integrated sensor and service port 100. The flared tube portion 124 may be used to connect the housing 112 to the HVAC service port.

In the illustrated embodiment, and as shown in FIG. 5, a sensor 120 is formed within the housing 112 at a point between the first and second connection portions 114, 116. The sensor 120 is also in communication with the channel 131, allowing the sensor 120 to sense a characteristic (e.g., pressure, temperature) of the HVAC unit/equipment. In one embodiment, the sensor 120 may be a pressure sensor such as e.g., a ceramic pressure sensor. In addition, the sensor 120 may be a pressure sensor capable of detecting pressure between 0 and 750 PSI (pounds per square inch). Alternatively, the sensor 120 could be a temperature sensor.

The sensor 120 is also connected to the third connection portion 118. As shown in FIG. 5, a retaining ring 128 may be located within the housing between the sensor 120 and the third connection portion 118. In one embodiment, the third connection portion 118 may be a metri pack connector allowing the reading of the sensor 120 to be sent to a monitoring system such as the system disclosed in U.S. patent application Ser. No. 15/153,950, now U.S. Pat. No. 10,753,630.

In one embodiment, the housing 112 may be made of brass or any other material suitable for use in an HVAC environment. The integrated sensor and service port 100 is weather proof and leak proof as all of its components are integrated into the house.

As can be appreciated, the integrated sensor and service port 100 disclosed herein has several advantages over the traditional mechanisms used to check the pressure or temperature of an HVAC unit. For example, there is no need to disconnect charging while testing the pressure or temperature. Moreover, because the components of the disclosed integrated sensor and service port 100 are integrated as one assembly, there are no connections or portions that leak. In addition, because the components of the disclosed integrated sensor and service port 100 are integrated as one assembly, it is compact and has a small size that does not lend itself to physical damage. Furthermore, the disclosed integrated sensor and service port 100 is esthetically pleasing.

Figure 7:
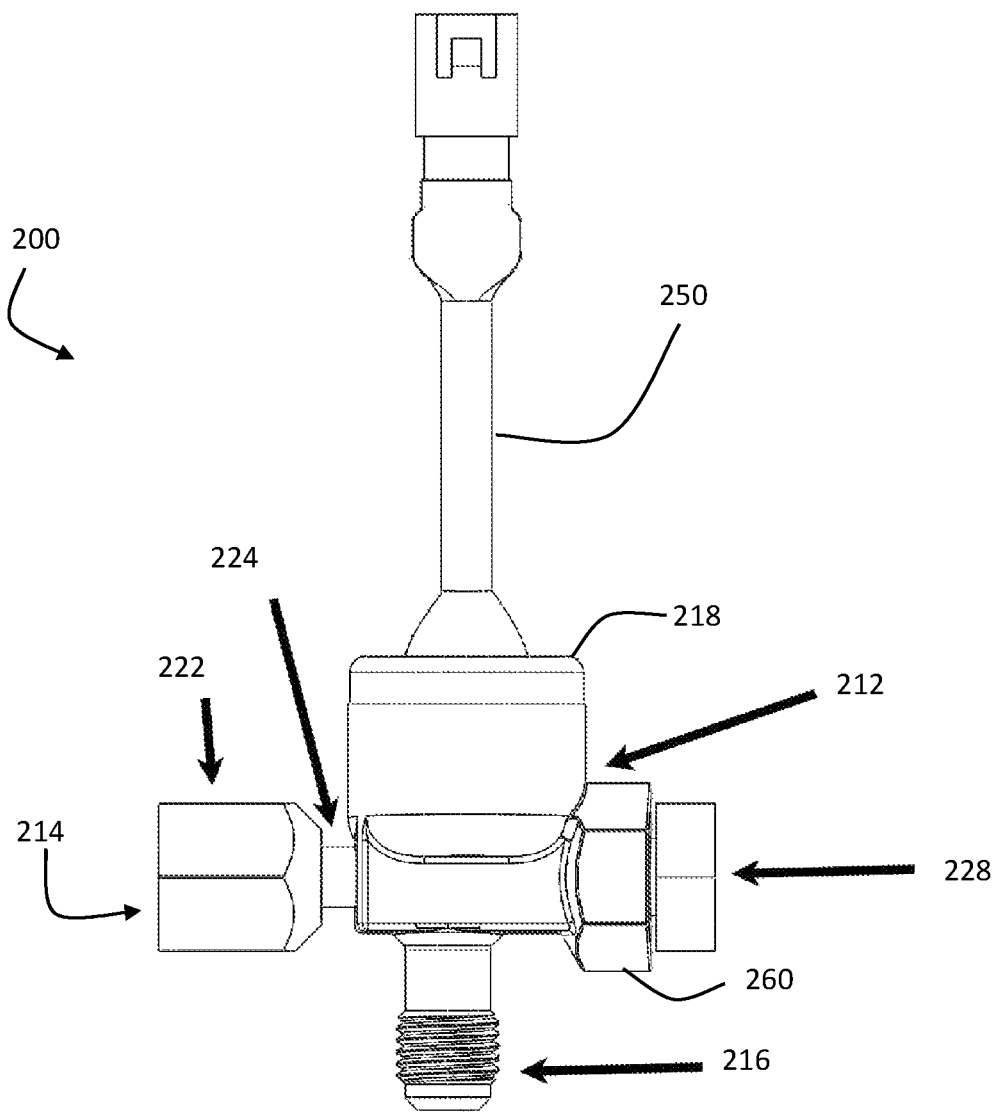
FIGS. 7-8 illustrate another example embodiment of an integrated sensor and service port in accordance with the disclosed principles.
Figure 8:
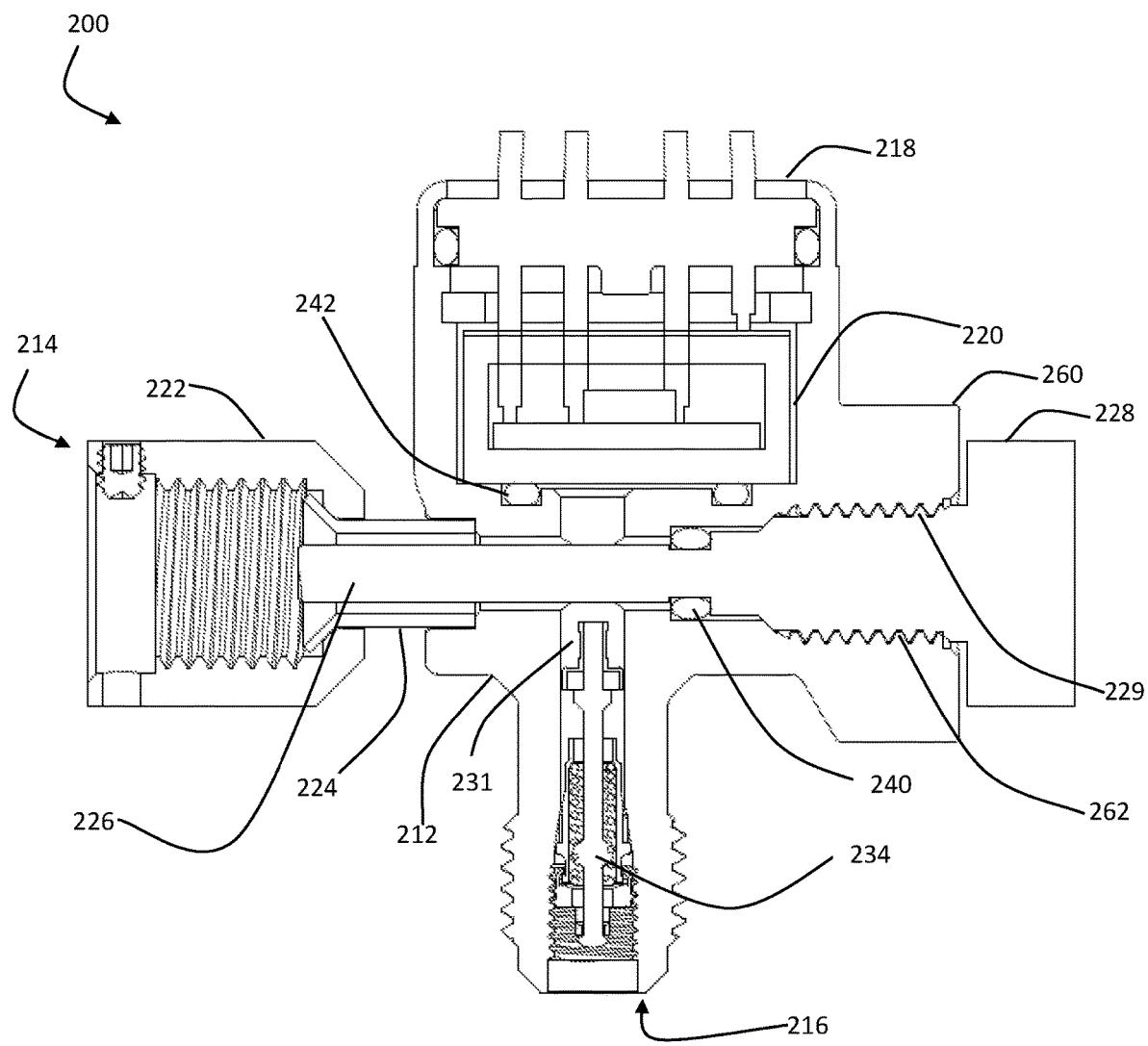

FIGS. 7-8 illustrate another embodiment of an integrated sensor and service port 200 constructed in accordance with the disclosed principles. The illustrated embodiment includes an anti-blowback feature (implemented e.g., using an O-ring 240 and a depressor 228) as described in more detail below. In the illustrated embodiment, the integrated sensor and service port 200 includes a single housing 212 into which a pressure sensor 220 (or other sensor such as e.g., a temperature sensor) may be integrated therein. In addition, a first connection portion 214 that may be a connector adapted to connect to and cooperate with an HVAC service port (e.g., Schrader valve or other type of valve) and a second connection portion 216 that may include a depressor valve core 234 that may function as a service port (e.g., Schrader valve core or other type of valve) may also be integrated as part of the housing 212. In one embodiment, a third connection portion 218 that may be a connector providing a mechanism to communicate the sensor's 220 reading outside of the integrated sensor and service port 200 may also be integrated as part of the housing 212. In the illustrated example, a harness 250 is connected to the third connection portion 218.

The first connection portion 214 may include a brass tube flare fitting 224, flare nut 222 and a depressor fitting 226 (as e.g., a Schrader depressor fitting) integrated therein. As can be appreciated, the first connection portion 214 may be connected to a service port typically used for HVAC equipment (e.g., Schrader valve or other type of valve) using the flare nut 222. In the illustrated example, the depressor fitting 226 is connected to a depressor 228 that extends through and outside of the housing 212 at depressor region 260.

In one or more embodiments, the depressor 228 may have a threaded portion 229 that may be screwed into a threaded portion 262 formed in region 260 of the housing 212. As such, the depressor 228 may be manipulated (i.e., rotated and or moved in a first direction) by a technician, installer or other personnel to retract the depressor fitting 226 further inside the housing 212 and away from the service port when it is desired to keep the service port closed (e.g., when it is desired that the depressor fitting 226 not depress the Schrader valve, keeping the service port closed or in a closed position). In addition, the depressor 228 may be manipulated (i.e., rotated and or moved in a second direction) by a technician, installer or other personnel to move the depressor fitting 226 towards the service port and activate the service port when it is desired to open up the service port (e.g., when it is desired that the depressor fitting 226 depress and open up the port's valve—i.e., in an opened position).

In the illustrated example, the first connection portion 214 includes a Schrader valve depressor fitting 226 adapted to open a Schrader valve or other type of valve used by the equipment's service port when the depressor 228 is rotated in the second direction. Thus, once the first connection portion 214 is connected to the HVAC equipment, and the depressor 228 is fully rotated in the second direction, the HVAC equipment's service port (e.g., valve) is opened by the depressor fitting 226.

In one or more embodiments, a depressor O-ring 240 may be included as part of the anti-blowback mechanism disclosed herein. The depressor O-ring 240 may be used to seal off refrigerant once the integrated sensor and service port 200 is installed and or during the installation of the integrated sensor and service port 200 on the service port.

The second connection portion 216 of the integrated sensor and service port 200, due to its configuration discussed below, may be used as a service port to be connected to the charging line or other service equipment. In essence, the second connection portion 216 is an extension of the equipment's service port, allowing a charging or other line to be connected to the unit through the integrated sensor and service port 200.

As shown in the cross-sectional view of FIG. 8, the second connection portion 216 may be internally threaded and may include a valve core 234 adapted to connect to a charging or other line typically connected to an HVAC service port. When connected to a charging line or other service equipment with the proper depressor, the valve core 234 will be depressed thereby opening up the second connection portion 216 to allow charging or other material to enter the housing 212.

As shown in the cross-sectional view of FIG. 8, a channel 231 is formed within the housing 212 between the first and second connection portions 214, 216, which allows the charging or other material to enter the HVAC equipment through the first connection portion 214 of the integrated sensor and service port 200.

In the illustrated embodiment, and as shown in FIG. 8, a sensor 220 is formed within the housing 212 at a point where the first and second connection portions 214, 216 internally intersect within the channel 231. The sensor 220 is also in communication with the channel 231, allowing the sensor 220 to sense a characteristic (e.g., pressure, temperature) of the HVAC unit/equipment. In one embodiment, the sensor 220 may be a pressure sensor such as e.g., a ceramic pressure sensor. In addition, the sensor 220 may be a pressure sensor capable of detecting pressure between 0 and 750 PSI (pounds per square inch). Alternatively, the sensor 220 could be a temperature sensor or a combined pressure and temperature sensor.

The sensor 220 is also connected to the third connection portion 218. As shown in FIG. 8, a sensor O-ring 242 may be located within the housing 212 between the sensor 220 and the third connection portion 218. In one embodiment, the third connection portion 218 may be a metri pack connector allowing the reading of the sensor 220 to be sent to a monitoring system such as the system disclosed in U.S. patent application Ser. No. 15/153,950, now U.S. Pat. No. 10,753,630.

In one embodiment, the housing 212 may be made of brass or any other material suitable for use in an HVAC environment. The integrated sensor and service port 200 is weather proof and leak proof as all of its components are integrated into the house.

In one or more embodiments, the integrated sensor and service port 200 comprises the anti-blowback mechanism to obtain advantages over prior assemblies (e.g., assembly 10 of FIG. 1). For example, to prevent refrigerant from being released during installation of the integrated sensor and service port 200, the depressor 228 is disconnected from the housing 212 (e.g., by being rotated out of the threaded portion 262) before installation begins and is only threaded into the housing 212 after the flare nut 222 is threaded on to the service port. This order first creates a seal between the flare fitting 224 and the service port without depressing the service port's Schrader valve. Subsequently, the depressor 228 may be threaded into the housing 212. As the depressor 228 is threaded into the housing 212, the depressor O-ring 240 creates a seal between the depressor 228 and the housing 212. The depressor 228 cause the depressor fitting 226 to depress the service port's Schrader valve allowing refrigerant into the sealed channel 231 of the housing 212. In a preferred implementation, the depressor 228 is threaded as far into the housing 212 as possible to create a metal-on-metal seal between the depressor 228 and the housing 212. The metal-on-metal seal may be required because refrigerant can deteriorate the depressor O-ring 240 over time.

As such, the disclosed integrated sensor and service port 200 may provide a method of installing the port 200 without leaking fluid by first sealing the sensor 220 housing to the service valve and then engaging the Schrader valve core with a depressor fitting 226 controlled by a threaded depressor 228. The threaded depressor 228 has two seals: a temporary seal while the depressor fitting 226 is engaging the service port valve core and a permanent seal for when the service port valve core is fully engaged. In this way the sensor 220 is exposed to the full pressure from the fluid without allowing that pressure to be exposed to the atmosphere during installation.

The foregoing examples are provided merely for the purpose of explanation and are in no way to be construed as limiting. While reference to various embodiments is made, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

Additionally, the purpose of the Abstract is to enable the patent office and the public generally, and especially the scientists, engineers and practitioners in the art who are not familiar with patent or legal terms or phraseology, to determine quickly from a cursory inspection the nature of the technical disclosure of the application. The Abstract is not intended to be limiting as to the scope of the present inventions in any way.

What is claimed is:

1. An apparatus comprising:
    a housing, said housing having a first connection portion, a second connection portion and a sensor integrated therein, the first connection portion being configured to connect with and cooperate with a service port of heating, ventilating, and air conditioning (HVAC) equipment, the second connection portion being configured to function as the service port, and the sensor adapted to sense a characteristic of the HVAC equipment, and
    an anti-blowback mechanism adapted to prevent the service port of the HVAC equipment from being opened until the first connection portion is connected to the service port of the HVAC equipment,
    wherein the anti-blowback mechanism comprises a depressor adapted to be received by the housing at a depressor region, the depressor comprising a threaded portion adapted to be received by a threaded portion of the depressor region, and rotation of the depressor in a first direction causes movement of the depressor in a first direction and rotation of the depressor in a second direction causes movement of the depressor in a second direction.

2. The apparatus of claim 1, wherein the first connection portion, the second connection portion and the sensor are in communication with a channel formed within the housing and said first connection portion comprises:
    a brass flare fitting over the channel;
    a flare nut over the brass flare fitting; and
    a depressor fitting within the brass flare fitting.

3. The apparatus of claim 2, wherein the depressor is connected to the depressor fitting, and
    movement of the depressor in the first direction retracts the depressor fitting within the housing, leaving the service port of the HVAC equipment in a closed position, and movement of the depressor in the second direction moves the depressor fitting towards the service port of the HVAC equipment such that the depressor fitting may place the service port of the HVAC equipment in an opened position.

4. The apparatus of claim 3, wherein the anti-blowback mechanism further comprises a depressor seal formed within the channel and around the depressor.

5. The apparatus of claim 3, wherein the second connection portion comprises:
    a threaded portion to allow a sealed connection to service equipment; and
    an internal valve core to allow service access to a pressurized system.

6. The apparatus of claim 1, wherein the housing comprises brass.

7. The apparatus of claim 1, wherein the sensor is a pressure sensor.

8. The apparatus of claim 1, wherein the sensor is one of a pressure sensor, temperature sensor or a combined pressure and temperature sensor.

9. The apparatus of claim 1, further comprising a third connection portion coupled to the sensor, the third connection portion adapted to provide a mechanism to communicate readings of the sensor outside of the apparatus.

10. An integrated sensor and service port device comprising:
    a brass housing, said housing having a service port opening and connection portion, a service port portion and a sensor integrated therein, the service port opening and connection portion configured to connect with and cooperate with a service port of heating, ventilating, and air conditioning (HVAC) equipment, and
    an anti-blowback mechanism adapted to prevent the service port of the HVAC equipment from being opened until the service port opening and connection portion is connected to the service port of the HVAC equipment, the anti-blowback mechanism comprising a threaded depressor adapted to be received by the housing at a depressor region, the threaded depressor contacting a depressor fitting adapted to form a temporary seal while the depressor fitting is engaging a valve core of the service port and a permanent seal when the service port valve core is fully engaged by the depressor fitting.

11. The integrated sensor and service port device of claim 10, wherein the service port portion is configured to function as the HVAC equipment service port and the sensor is adapted to sense a characteristic of the HVAC equipment.

12. The integrated sensor and service port device of claim 11 wherein the service port opening and connection portion, service port portion and the sensor are in communication with a channel formed within the housing and said service port opening and connection portion comprises:
    a brass tube flare fitting over the channel; and
    a flare nut over the brass tube flare fitting;
    wherein the depressor fitting is within the brass tube flare fitting.

13. The integrated sensor and service port device of claim 12,
    wherein movement of the depressor in a first direction retracts the depressor fitting within the housing, leaving the service port of the HVAC equipment in a closed position, and movement of the depressor in a second direction moves the depressor fitting towards the service port of the HVAC equipment such that the depressor fitting may place the service port of the HVAC equipment in an opened position.

14. The integrated sensor and service port device of claim 13, wherein the anti-blowback mechanism further comprises a depressor seal formed within the channel and around the depressor.

15. The integrated sensor and service port device of claim 13, wherein the depressor comprises a threaded portion adapted to be received by a threaded portion of the depressor region, and movement of the depressor in the first direction comprises rotation of the depressor in a first direction and movement of the depressor in the second direction comprises rotation of the depressor in a second direction.

16. The integrated sensor and service port device of claim 12, wherein the service port portion comprises:
   a threaded portion to allow a sealed connection to service equipment; and
   an internal valve core to allow service access to a pressurized system.

17. The integrated sensor and service port device of claim 10, wherein the housing comprises brass.

18. The integrated sensor and service port device of claim 10, wherein the sensor is a pressure sensor.

19. The integrated sensor and service port device of claim 10, further comprising a communication connection coupled to the sensor, the communication connection adapted to communicate readings of the sensor outside of the device.

* * * * *